Oct. 23, 1962  M. M. LÓPEZ  3,059,715
ACCELERATOR CONTROL DEVICE
Filed Sept. 16, 1958
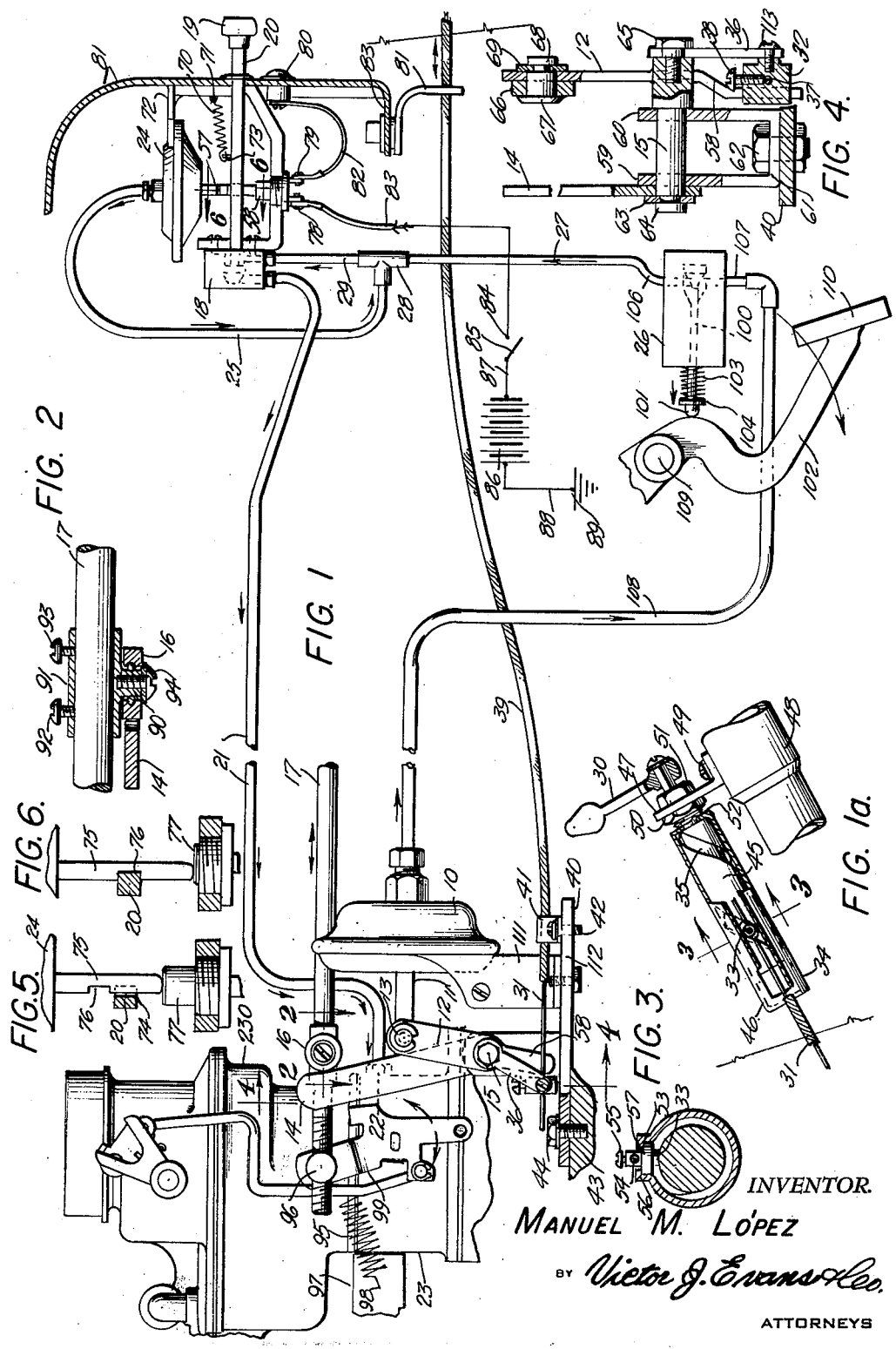
INVENTOR.
MANUEL M. LÓPEZ
BY Victor J. Evans & Co.
ATTORNEYS

United States Patent Office 3,059,715
Patented Oct. 23, 1962

3,059,715
ACCELERATOR CONTROL DEVICE
Manuel M. López, 523 Market St., Mount Carmen, Ill.
Filed Sept. 16, 1958, Ser. No. 761,303
1 Claim. (Cl. 180—77)

This invention relates to controllers for motor vehicles, and in particular a vacuum actuated controlling device set to a predetermined speed by a button and operated by a knob actuated vacuum valve which connects the vacuum of an internal combustion engine to a locking diaphragm and also to an accelerator actuating diaphragm through a control valve associated with a foot brake lever whereby upon application of the foot brake lever the vacuum is released permitting the accelerator valve of the carburetor of the internal combustion engine to return to the slow or idling position.

The purpose of this invention is to provide a controller assembly for motor vehicles in which the device is made inoperative by a slight movement of a foot brake lever of the vehicle and wherein additional speed for passing and hill climbing is obtained by pressing the accelerator pedal.

Various types of control devices have been provided for motor vehicles, however, devices for limiting speed have not been accepted by motor vehicle manufacturers because such devices do not make provision for additional speed in passing or hill climbing and also do not include means for instantly slowing down a vehicle in an emergency. With this thought in mind this invention contemplates a control system in which the parts are operated by the vacuum of the engine whereby flexibility of control is provided and wherein speed of a vehicle may be increased or decreased without the use of the hands of the operator.

The object of this invention is, therefore, to provide vacuum actuated elements in combination with a control device wherein the parts respond instantly to manual operation of parts thereof.

Another object of the invention is to provide a control device for motor vehicles in which the accelerator is actuated by a vacuum operated diaphragm wherein upon release of the vacuum the speed of the engine is reduced to the extreme low or idling speed.

Another important object of the invention is to provide a manual control vacuum operated control device for motor vehicles in which the device may readily be installed in combination with a conventional internal combustion engine without changing the parts of the engine.

A further object of the invention is to provide a manual control vacuum actuated control device for internal combustion engines in which the device is of a simple and economical construction.

With these and other objects and advantages in view the invention embodies a manually actuated valve, positioned with one side thereof connected to a vacuum opening in the intake manifold of an internal combustion engine and with the opposite side connected to a locking diaphragm and also, through a control valve, to a diaphragm for actuating the accelerator or butterfly valve of the carburetor of the engine, and a control which makes shorter or longer the stroke of the diaphragm that actuates the accelerator or butterfly valve of the carburetor of the engine of a vehicle in which the device is installed.

Other features and advantages of the invention will appear from the following description taken in connection with the drawing, wherein:

FIGURE 1 is a longitudinal section through a portion of a motor vehicle showing, particularly, the instrument panel of the vehicle and the carburetor of the engine with other parts of the vehicle omitted and with the parts diagrammatically shown.

FIGURE 1a is a side elevational view with parts broken away and shown in section showing the upper portion of a steering wheel post or column and showing, in particular, the mounting of the vacuum control device thereon.

FIGURE 2 is a sectional plan taken on line 2—2 of FIGURE 1 showing the mounting of a roller on a rod extended from an accelerator pedal of a motor vehicle, the parts being shown on an enlarged scale.

FIGURE 3 is a cross section through the upper portion of the vacuum control device taken on line 3—3 of FIGURE 1a.

FIGURE 4 is a cross section through the carburetor operating instrumentalities taken substantially on line 4—4 of FIGURE 1 with parts broken away and parts shown in section and with the parts shown on an enlarged scale.

FIGURE 5 is a section showing latching means for retaining a switch in the closed position to provide a light on the instrument panel of a vehicle to indicate that the control device is in operation.

FIGURE 6 is a view similar to that shown in FIGURE 5 showing the latching means with a shaft of a button for actuating the vacuum switch in the position of retaining the contacts in an open position.

Referring now to the drawing wherein like reference characters denote corresponding parts the improved control device of this invention includes a diaphragm or vacuum operated actuator 10 having a stem 11 pivotally connected to an arm 12 by a pin 13, a lever 14 mounted on a shaft 15 and connected thereby to the arm 12, a roller 16 mounted on the accelerator rod 17 whereby the rod and accelerator valve are actuated by the diaphragm actuator 10, a valve 18 actuated by a knob 19 on a stem 20 and connected by a tube 21 to a vacuum connection 22 of a manifold 23, a diaphragm actuator 24 connected by a tube 25 to the valve 18, a control valve 26 connected by a tube 27 to a fitting 28 that is connected by a tube 29 to the valve 18, and a lever 30 connected by a flexible shaft 31 to a speed control block 32 through a pin 33 in a cylindrical casing 34 and wherein the pin is actuated by a quick thread 35 to adjust the position of the limit block 32.

The block 32 is mounted on the lower end of a link 36 pivotally mounted on the shaft 15 on which the arms 12 and 14 are mounted. The block 32 is provided with a passage 37 in which the flexible shaft 31 is secured by a screw 38 and the flexible shaft, which extends through a sheath 39 is secured to a mounting plate 40 by a clamp 41 extended around the sheath 39 and secured by screws 42 to the plate or flange 40. The plate 40 is secured to a crankcase 43 of the lower portion of an engine by cap screws 44.

The quick thread 35 is provided in a cylinder 45 in a casing 46 that is secured by a bracket 47 to a steering wheel post 48, the bracket being secured to the post by a screw 49 and the casing 34 being secured to the bracket 47 by nuts 50 and 51, both of which are threaded on a nipple 52 extended from the casing 34.

Upon turning the flexible shaft 31 by the lever 30 the roller 53 on the pin 33 travels in the groove 35 whereby the flexible shaft 31 is actuated longitudinally, the flexible shaft 31 being secured in an opening 54 in the pin 33 by a screw 55. The casing 34 is provided with an elongated boss 56, the upper surface of which is provided with a slot 57 through which the pin 33 extends.

The block 32 is positioned to be engaged by a lower end 58 of the arm 12 and by setting the block 32 with the lever 30 the speed of a vehicle upon which the device is mounted is selected.

The shaft 15 is rotatably mounted in arms 59 and 60 of a bracket 61 and the bracket is secured to the mounting plate 40 by a bolt 62. The arm 14 extends from one end of the shaft 15 and the arm is retained in position by a spring fastening element 63 snapped below the head 64 of the bolt 15. The link 36 is secured on the opposite end of the shaft 15 by a screw 65 and an eye 66 on the end of the stem 11 of the actuator 10 is secured to the upper end of the arm 12 by a pin 67, the opposite end of which is provided with a head 68 and a spring lock washer 69.

The stem 20 of the knob 19 is urged outwardly with the knob extended by a spring 70, one end of which is attached to an eye 71 on the casing 72 and the opposite end of which is connected to an eye 73 on the stem 20. The inner portion of the stem 20 is provided with a notch 74 and the notch is positioned to receive a stem 75 of the diaphragm actuator 24, the stem 75 also being provided with a notch 76 that is positioned to receive the stem 20 to retain the stem in an extended position, as illustrated in FIGURE 6. When released the stem 75 is snapped upwardly by a spring housing 77 which closes contacts 78 and 79 to complete a circuit to a light 80 extended through an instrument panel 81. The light is connected to the contact 79 by a wire 82 and the contact 78 is connected by a wire 83 to a terminal 84 of a switch 85, the opposite terminal of which is connected to a battery 86 by a wire 87. The opposite terminal of the battery is connected by a wire 88 to a ground 89.

The upper end of the arm 14 engages the surface of the roller 16 which is rotatably mounted on a nipple 90 extended from a sleeve 91 that is secured to the rod 17, which extends from the accelerator pedal, by screws 92 and 93. The roller is retained in position on the nipple by a screw 94 that is threaded through the nipple. The roller 16 is urged against the arm 14 by a spring 95, one end of which is attached to the rod 17 by a pin 96 and the opposite end of which is attached to a web 97 of the manifold by a pin 98. The pin 96 connects the rod 17 to a conventional actuating lever 99 of a carburetor.

The control valve 26, which is a flying plate type valve is provided with an actuator rod 100 having a head 101 on one end that is positioned to contact a foot brake lever 102 and the head is urged against the lever by a spring 103 extended around the rod and positioned against the end surface of the valve and a collar 104 on the rod. The valve is provided with an inlet connection 106 to which the tube 27 extended from the valve 18 is connected and also a connection 107 that is connected to the diaphragm actuator 10 by a tube 108. The lever 102 is pivotally mounted on a vehicle by a pin 109 and the extended end is provided with a foot treadle 110.

With the parts assembled as illustrated and described the valve 18 with the knob 19 by which the valve is operated are mounted on a dashboard or instrument panel of a motor vehicle with the lever 30 suspended from the lower edge of the panel, and the diaphragm actuator 10 is supported on the engine or carburetor housing by the mounting plate 40 on which the diaphragm housing is supported by the bracket 111 and in which the arm 12 and lever 14 which are pivotally mounted by the shaft 15 are supported in a bracket 61 extended upwardly from the plate 40 in which the bolt 62 is positioned. The bolt 62 extends through an elongated slot 112 in the plate 40 providing longitudinal adjustment so that the upper end of the lever 14 may be accurately adjusted.

With the button 30 set to the desired speed the valve 18 is opened by the knob 19 so that vacuum is connected from the engine manifold or casing through the tubes 21, 27 and 108 to the diaphragm actuator 10 whereby the vehicle will travel on a substantially level road at a constant speed without the necessity of using the foot accelerator pedal.

At the same time it is possible to use the conventional foot accelerator pedal to supply additional fuel or speed for passing and also for hill climbing. Furthermore, should it become necessary at any time, to reduce the speed of a vehicle it is only necessary to press on the foot pedal whereby the control valve 26 closes the vacuum supplied to the diaphragm actuator 10, permitting the spring 98 to close the throttle, there being sufficient air leakage to atmosphere in the valve 26 to relieve the vacuum in the tube 108 and permit relaxation of the diaphragm in the actuator 10.

The system, therefore, provides means that may be set at any predetermined position to control the supply of fuel to the engine of a motor vehicle for operating the motor vehicle at a constant speed without the continuous use of the foot accelerator pedal and also provides means for supplying additional fuel when required, and furthermore, includes means for reducing the speed when desired.

The stroke of the levers is controlled by the link 36, the upper end of which is secured to the end of the shaft 15 by the screw 65, and the lower end of which is pivotally connected to the block 32 by a screw 113. The link controls the stroke of the lever and the stem of the diaphragm actuator.

The speed is controlled by the lever 30 as moving the lever to the left decreases the speed, and moving the lever to the right increases the speed. The position of the block 32 is adjusted by the lever 30 through the flexible shaft, cable, or wire 31 whereby the speed is controlled from the steering wheel column at the time the motor is shut off. The device may also be operated manually.

It will be understood that modifications, within the scope of the appended claim, may be made in the design and arrangement of the parts without departing from the spirit of the invention.

What is claimed is:

For use with a motor vehicle having a brake pedal arm normally in a brake-off position and movable between the brake-off position and a brake-applied position, an intake manifold, a carburetor, a normally closed openable and closeable throttle valve in said carburetor, and a reciprocable control rod operatively connected to said throttle valve, a device for releasably holding said control rod at a preselected valve-open position, said device comprising a vacuum-operated actuator having a reciprocable stem, a stop element carried by said control rod, a swingable arm having one end connected to said manifold and having the portion adjacent the other end engageable with said stop element, said arm being operable upon execution of swinging movement in one direction to engage said stop element and shift said control rod to open position, said actuator stem being operatively connected to said arm for effecting the movement of said arm in said one direction responsive to the application of vacuum to said actuator, a conduit having one end connected in communication with said manifold and having the other end connected in communication with said actuator, an openable and closeable valve in said conduit, said conduit valve having a stem engaging said brake pedal arm and holding said valve in the open position when said brake pedal arm is in brake-off position, and a spring operatively connected to said valve stem and operable to shift said conduit valve to closed position upon execution of movement of said brake pedal arm from the brake-off position.

References Cited in the file of this patent

UNITED STATES PATENTS

| | | |
|---|---|---|
| 2,110,125 | Galloway | Mar. 8, 1938 |
| 2,115,878 | Rodman | May 3, 1938 |
| 2,671,542 | Robnett | Mar. 9, 1954 |
| 2,708,979 | Reynoldson | May 24, 1955 |
| 2,714,880 | Riley | Aug. 9, 1955 |
| 2,816,617 | Lee | Dec. 17, 1957 |
| 2,825,418 | Kershman | Mar. 4, 1958 |
| 2,835,237 | Thorner | May 20, 1958 |
| 2,916,100 | Teetor | Dec. 8, 1959 |